Patented Oct. 30, 1928.

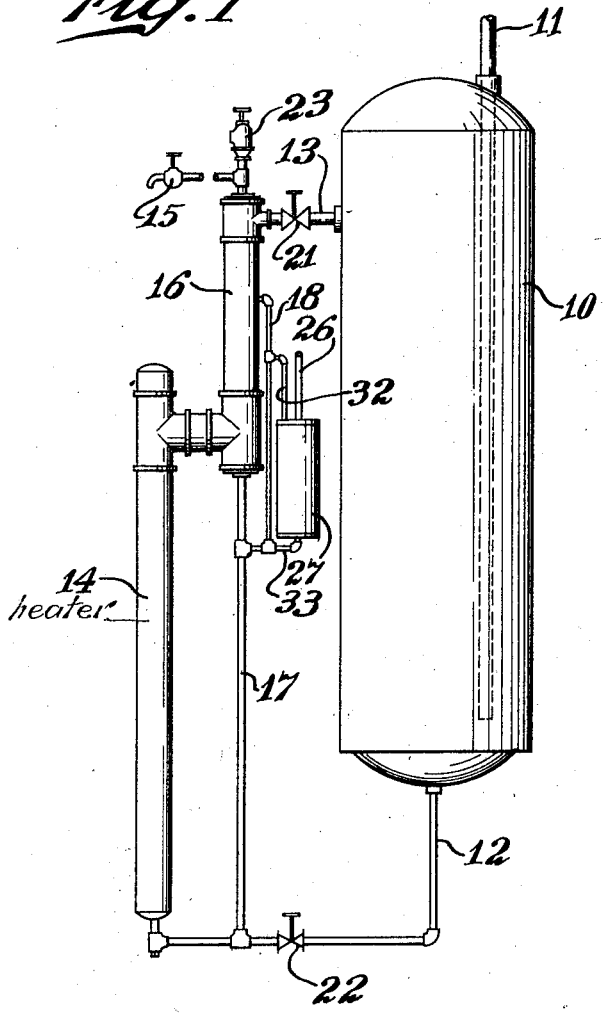
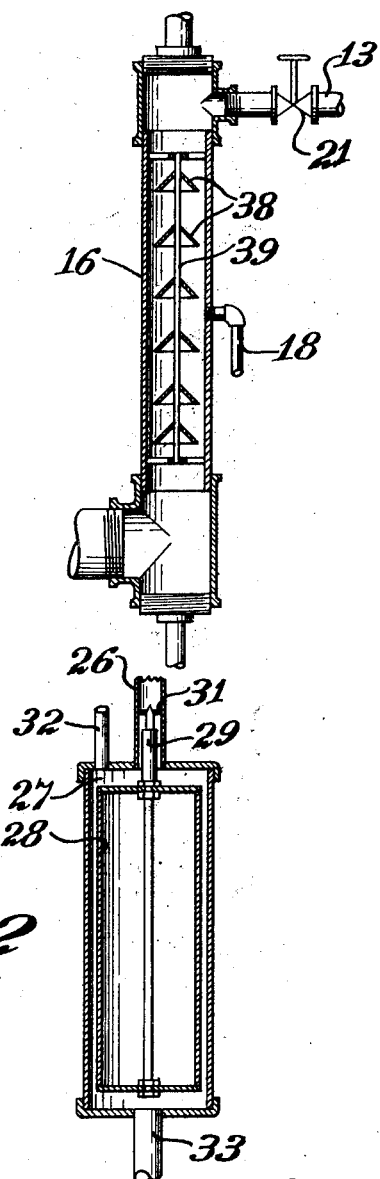

1,689,745

UNITED STATES PATENT OFFICE.

MARK L. NICHOLS, OF AUBURN, ALABAMA, ASSIGNOR TO ALABAMA POWER COMPANY, A CORPORATION OF ALABAMA.

STEAM GENERATOR.

Application filed September 30, 1927. Serial No. 223,171.

My invention relates to steam generators, more particularly to apparatus for generating steam for household use, such as sterilizing utensils, and has for its object the provision of apparatus of the character designated which may be readily installed and become a part of the hot water heating plant commonly employed in a household.

Another object of my invention is to provide a steam generator adapted for association with an automatic hot water tank heater and which shall embody means for readily converting such apparatus to apparatus for generating steam.

As is well known in the art to which my invention relates, tank heaters for supplying hot water for household purposes are in wide use in households. The heater usually embodies an elongated tank, vertically disposed, and having associated therewith a thermo-siphon circuit, the latter including a heating means. Communicating with the lower part of the tank is a supply of cold water which maintains the circuit full at all times.

My invention is especially adapted for association with a heater such as just described. Briefly, it comprises structure which is included in the thermo-siphon circuit and which is adapted to form a steam dome. The steam dome is located above the heater means and a second circuit shunts the dome with respect to the main thermo-siphon circuit. Included in the shunt circuit and also shunted therefrom is a normally inoperative water supply means, including means for automatically maintaining the water level over the heating means and below the upper level of the steam dome. Means are provided for disassociating the tank from the circuit, whereupon the normally inoperative supply means becomes automatically operative. When so disassociated, the apparatus is adapted to generate steam for household purposes and means are provided, at such times, to withdraw steam from the steam dome. Means are also provided, when withdrawing steam from the steam dome, to prevent water from being withdrawn with the steam.

Apparatus embodying features of my invention is illustrated in the accompanying drawings, forming a part of this application, wherein Fig. 1 is a view, in elevation, showing a household tank heater having my invention associated therewith;

Fig. 2 is a detail sectional view of the automatic water level maintaining means employed therein; and Fig. 3 is a sectional view of the steam dome employed with my apparatus.

Referring to the drawing, I show a storage tank 10 connected to a water supply system by a conduit 11 which, as shown by the dotted lines, extends downwardly in the tank 10 to a point near the bottom thereof. A thermo-siphon circuit is associated with the tank and embodies a lower conduit 12, an upper conduit 13, and a heating means 14. In the example shown in the drawing, the heating means is a well known type of electrical apparatus, though it will be understood that the heating means may comprise any suitable apparatus known to the art. Hot water may be withdrawn from the system by a valve or faucet 15 communicating with the upper part of the circuit.

As is well understood, the apparatus so far described is that commonly used in households. The water supply means 11 maintains the tank 10 and the thermo-siphon circuit full at all times. Water is heated by the means 14 and rises to the upper part of the tank, displacing cold water therein which flows to the heating means through the lower conduit 12. As is also well known, it is very desirable to employ steam for sterilizing and cleansing certain utensils, especially vessels which are to contain milk and dairy products. I have accordingly devised a simple, effective apparatus which may be installed in connection with the heater of the character described and which embodies means for readily converting the heater to apparatus for generating steam.

In order to accomplish the purpose mentioned above, I provide an element 16 which is adapted to form a steam dome. The element 16, as may best be seen in Fig. 3, is preferably made from standardized pipe fittings of relatively large diameter, say standard 2" fittings. The steam dome 16 is connected at its upper end to the upper conduit 13 of the thermo-siphon circuit, and at its lower end to the conduit associated with the heating means 14. Thus, when the apparatus is being employed to heat water, it is filled with water at all times and the steam dome 16 functions no differently from any other conduit which might be placed in the circuit in a like position. Connected to the lower end of the steam dome 16 is a by-pass or shunt pipe 17 which connects into the lower conduit 12. Connected to the steam dome 16 and to the conduit 17 is a conduit 18 so as to form a by-pass or shunt water circuit with the steam dome 16.

Provided in the upper conduit 13 is a valve 21 and provided in the lower conduit 12 is a valve 22, which valves are closed whenever it is desired to generate steam with the apparatus. It will be seen that with the valves 21 and 22 closed, that the conduit 17 forms an independent thermo-siphon circuit with the heating means whereby the relatively small amount of water associated with the heater means may be boiled and supply steam. In order to prevent too great a pressure from being formed, a safety valve 23, of any suitable design, may be attached to the upper end of the steam dome 16.

In order to maintain a proper water level in the steam generating apparatus, I provide an independent water supply conduit 26 leading to a chamber 27, which may also be formed from standard pipe fittings, and which contains a float 28, the latter being freely slidable in the chamber 27. Controlled by the float 28 is a valve 29 which extends upwardly into the supply conduit 26 and co-operates with a suitable seat 31 provided therein. In order to obviate difficulties of alignment, the valve 29 is preferably made separate from the float 28. The chamber 27 communicates by way of a conduit 32, at its upper end, and a conduit 33, at its lower end, with the conduit 18. By so connecting it to the system, I have found that steam does not boil back into the float chamber when steam is being generated, due to the functioning of the by-pass conduit 18.

It will be seen from the above description that when the valves 21 and 22 are open and the apparatus is being used solely as a water heater, the float 28 holds the valve 29 on its seat and no water enters the system through said valve. During such operation, therefore, the water supply means through the conduit 26 is inoperative. When the valves 21 and 22 are closed, however, and the apparatus is being used to generate steam, when the water level falls below a point determined by the buoyancy of the float 28, the valve 29 is opened and the water level is maintained constant. The float 28 and valve 29 should be so constructed and positioned as to maintain the water level above the heating means 14, as shown in Fig. 3, thereby preventing the heating element from burning out or from damaging the coil.

Whenever the apparatus described is being employed to generate steam, steam may be withdrawn through the valve 15. In order to prevent water from being withdrawn with the steam, I provide a series of baffles 38 carried by a central rod 39 in the steam dome 16. The baffles 38 are made of such diameter, smaller than the diameter of the steam dome 16, as not to interfere with the free functioning of the thermo-siphon circuit when the apparatus is being employed to heat water.

When the valves 21 and 22 are first closed to begin the generation of steam, the dome 16 is full of water. If the valve 15 is opened immediately thereafter there may be a small amount of water flow through it before the steam begins to flow. If the valve is not opened immediately, the safety valve 23 takes care of any undue pressure in the dome 16 and will do so until the water level in the dome 16 has fallen sufficiently to form a steam space therein.

From the foregoing it will be apparent that I have devised an improved steam generating apparatus which may be readily installed in association with an ordinary water tank heater and which includes means automatically operable, upon disassociation of the water tank, to generate the steam and maintain a desired constant water level in the apparatus.

While I have shown my invention in but one form, it will be obvious to those skilled in the art that it is not so limited, but is susceptible of various changes and modifications, without departing from the spirit thereof, and I desire therefore, that only such limitations shall be placed thereupon as are imposed by the prior art or as are specifically set forth in the appended claims.

What I claim is:—

1. The combination with a hot water tank having a thermo-siphon circuit associated therewith and with heating means included in the circuit, of means included in the circuit and adapted to form a steam space, and means, when desired to generate steam, for automatically maintaining a water level in the heating part of the circuit below said steam space.

2. The combination with a hot water tank having a thermo-siphon circuit associated therewith and with heating means included in the circuit and positioned in a lower portion of the circuit, means adapted to form a steam space included in the circuit above the heating means, means for disassociating the tank from the circuit, and means automatically operative upon disassociation of the tank for maintaining the water level over the heating means and below the steam space.

3. The combination with a hot water tank having water supply means and a thermo-siphon circuit associated therewith, and heating means included in the circuit, of means adapted to form a steam space included in the circuit, a second thermo-siphon circuit in shunt with the first mentioned circuit, means for disassociating the hot water tank from the circuits, and means automatically operative upon disassociation of the tank to maintain a water level in the shunt circuit below the steam space.

4. The combination with a hot water tank having water supply means and a thermo-siphon circuit associated therewith, and heating means included in the circuit, of means adapted to form a steam space included in the circuit, a second thermo-siphon circuit in shunt with the first mentioned circuit, a separate normally inoperative water supply means associated with the shunt circuit, means for disassociating the hot water tank from the circuits, and means automatically operative upon disassociation of the water tank to maintain a water level in the shunt circuit over the heating means and below the steam space.

5. The combination with a hot water tank having a water supply and a thermo-siphon circuit associated therewith and heating means included in the circuit, said heating means being disposed in a lower part of the circuit, of a relatively large elongated member included in the circuit above the heating means and adapted to form a steam dome, a shunt conduit from the steam dome to the lower part of the circuit, means for disassociating the water tank from the circuit, means automatically operable upon disassociation of the water tank to maintain a water level over the heating means and below the upper portion of the steam dome and means for connecting said water level maintaining means in shunt with the steam space of the steam dome and the shunt conduit.

6. Apparatus as set forth in claim 5 wherein means are provided for withdrawing steam from the steam dome when the tank is disassociated from the circuits.

7. Apparatus as set forth in claim 5 wherein means are provided for withdrawing steam from the steam dome when the tank is disassociated from the circuits and wherein baffle means are provided in the steam dome to prevent overflow of water therefrom when withdrawing steam.

In testimony whereof I, MARK L. NICHOLS, affix my signature.

MARK L. NICHOLS.